United States Patent
Chakraborty et al.

(10) Patent No.: US 10,200,470 B1
(45) Date of Patent: Feb. 5, 2019

(54) DATA DRIVEN BACKUP POLICY FOR DATA-CENTERS AND APPLICATIONS

(71) Applicant: EMC IP Holding Company LLC, Hopkinton, MA (US)

(72) Inventors: Anupam Chakraborty, Bangalore (IN); Tushar Dethe, Bangalore (IN); Shubhashish Mallik, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 204 days.

(21) Appl. No.: 14/871,760

(22) Filed: Sep. 30, 2015

(51) Int. Cl.
*H04L 29/08* (2006.01)

(52) U.S. Cl.
CPC ...... *H04L 67/1095* (2013.01); *H04L 67/1097* (2013.01); *H04L 67/16* (2013.01)

(58) Field of Classification Search
CPC .. H04L 67/1095; H04L 67/16; H04L 67/1097
See application file for complete search history.

(56) References Cited

U.S. PATENT DOCUMENTS

| | | | | |
|---|---|---|---|---|
| 8,751,515 | B1* | 6/2014 | Xing | G06F 17/30073 707/755 |
| 8,819,362 | B1* | 8/2014 | Duprey | G06F 11/2069 711/161 |
| 8,996,460 | B1* | 3/2015 | Frank | G06F 17/30088 707/624 |
| 2007/0260842 | A1* | 11/2007 | Faibish | G06F 3/061 711/170 |
| 2012/0084775 | A1* | 4/2012 | Lotlikar | G06F 9/45558 718/1 |
| 2015/0242283 | A1* | 8/2015 | Simoncelli | G06F 11/1456 711/162 |
| 2015/0324144 | A1* | 11/2015 | Vasilyev | G06F 11/1451 711/162 |

* cited by examiner

*Primary Examiner* — Brian J. Gillis
*Assistant Examiner* — Chhian (Amy) Ling
(74) *Attorney, Agent, or Firm* — Van Pelt, Yi & James LLP

(57) ABSTRACT

Techniques to protect against data loss are disclosed. In various embodiments, an amount of data that has changed since a last backup of at least a defined subset of a save set is determined. The determined amount of changed data is compared to a corresponding threshold. A backup is performed based at least part on a determination that the determined amount of changed data equals or exceeds the threshold.

22 Claims, 5 Drawing Sheets

DATA DRIVEN BACKUP POLICY FOR DATA-CENTERS AND APPLICATIONS

BACKGROUND OF THE INVENTION

Backup is a primary operation to protect data from corruption or accidental deletion. Traditionally, backup is triggered by a backup policy. In the EMC® Networker® suite of backup products, for example, backup may be governed by a policy expressed as a Recovery Point Objective (RPO). In prior approaches, the RPO typically is a measure of the maximum time period in which data might be lost if there is a Major Incident affecting an information technology (IT) service—not a direct measure of how much data might be lost. But in today's world an application or data center can scale rapidly. Statically configured backup policies based on RPO possess the risks of not protecting a very high amount of data in scale out environment.

A new dynamic backup policy based on amount of data change is needed in today's scale out and elastic environments. This policy is based on the amount of unprotected data an IT-Service can afford to lose in case of disaster. Backup applications are programmed to find the amount of unprotected data in the environment and triggers backup when the amount of unprotected data exceeds the threshold. The policy can be configured for the whole application or different directories of an application. For example in SQL/Exchange either we can set a single threshold for the whole SQL/Exchange Server or separate threshold for each database or group of databases in the server. Similarly in Hypervisor environment the policy can be configured for complete data center or a subset of virtual machines.

This policies doesn't affect the performance of production environment as backup is performed from the snapshot of volume. The backup applications also supports dedicated node to perform backup from the snapshot. Thus this policy can be triggered during any point in the day without affecting production environment.

BRIEF DESCRIPTION OF THE DRAWINGS

Various embodiments of the invention are disclosed in the following detailed description and the accompanying drawings.

DETAILED DESCRIPTION

Figure 1:
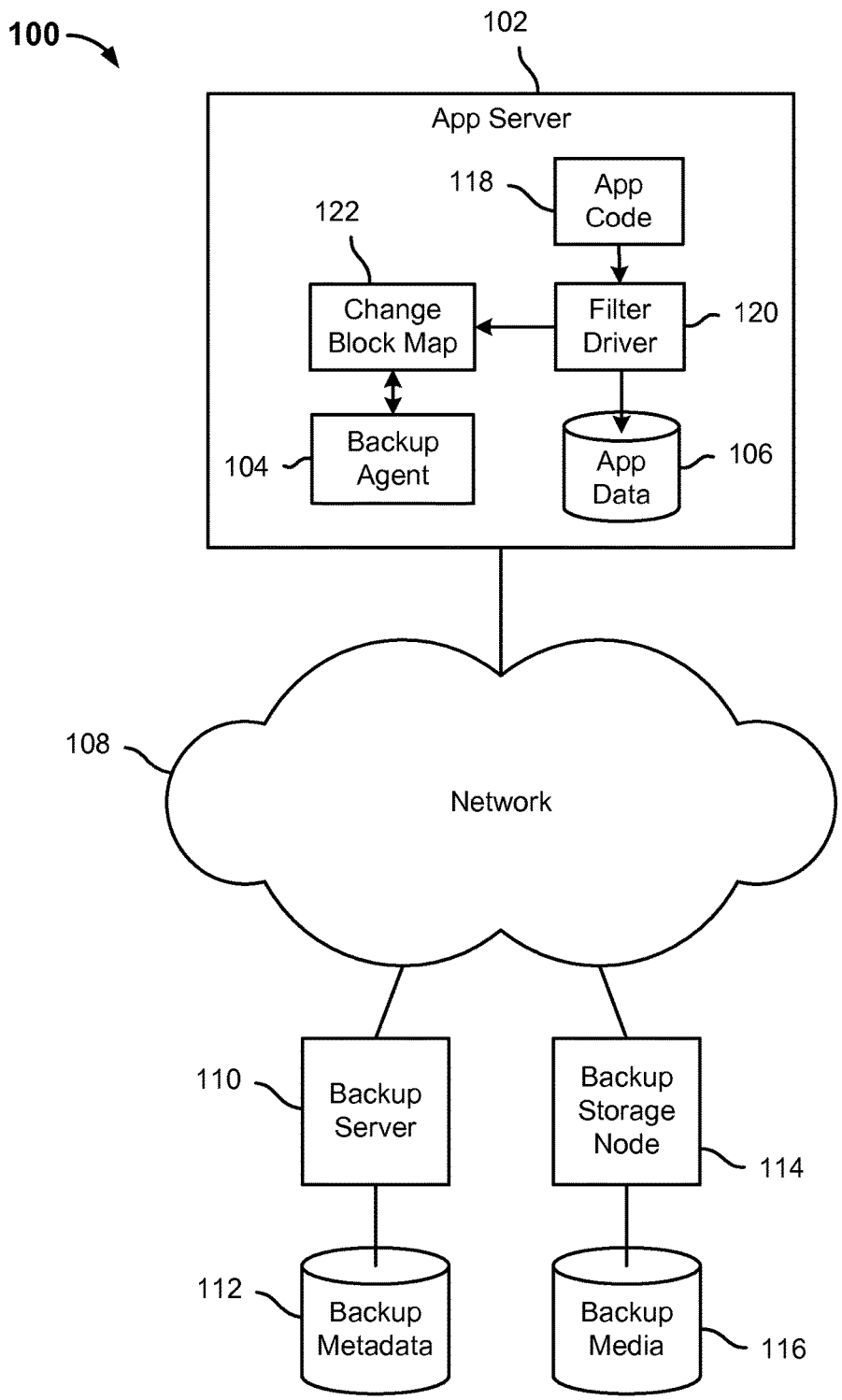
FIG. 1 is a block diagram illustrating an embodiment of a backup system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to implement a backup policy that is based on the amount of data that has changed since the last backup are disclosed. In various embodiments, a backup policy may be defined with reference to a maximum amount of data that can remain unprotected in case of disaster. The amount of data that has changed since the last backup is measured and/or computed, e.g., periodically and/or based on some other criteria or trigger. If more than a prescribed amount of data is determined to have been changed, a backup is performed.

A backup policy defined based on the amount of data that has changed may be more suitable for today's highly scalable applications compared to traditional RPO based policy. In various embodiments, a filter driver for change tracking can be used to apply different policies for different directories or databases of a scalable application.

In today's world, mission critical applications (SQL, Microsoft® Exchange®, etc) may run on distributed systems that ensure high availability and scalability. Apart from these distributed systems, hypervisors (e.g., Microsoft Hyper-V & VMWare ESX Servers), such as may be used to provide computation power in data centers, also are highly scalable. In these systems, the amount of data can scale from a few gigabytes to petabytes very quickly. Traditional backup policies based on RPO may not be able to guarantee the amount of data lost in case of disaster.

In various embodiments, the amount of data that has changed since the last backup may be tracked. In some embodiments, a change tracking filter driver inserted into the storage stack creates an in-memory bit map to track which file system blocks are changed. The block size being used by a file system may be determined using system calls. The amount of data that has changed, and which blocks have changed, may be determined from change block tracking. For example, the amount of data that has changed may be computed using the change block tracking data to determine how many blocks have changed, and multiplying that number by the block size. This method supports tracking of data changed for any application.

In some embodiments, a hypervisor, such as Hyper-V and ESX, may provide their own change block tracking. When change block tracking is enabled for virtual machines, the hypervisor typically creates a child differential virtual hard disk ("differencing VHD") and write operations are done to this differencing VHD. The child differencing VHD typically points to the parent VHD, which goes into read-only mode. At any point in time, the child differencing VHD may be queried to determine its size, which by definition indicates the amount of data that has changed in the virtual machine.

FIG. 1 is a block diagram illustrating an embodiment of a backup system and environment. In the example shown, enterprise network environment 100 includes one or more application servers, represented in FIG. 1 by application server 102. Application server 102 is shown to have installed thereon a backup agent 104 configured to back up application data 106. In various embodiments, backup agent 104 communicates via network 108 with a backup server 110 configured to use backup metadata 112 to back up application data 106. Backup agent 104 and backup server 110 may cooperate to cause application data 106 to be backed up via network communications sent via network 108 to one or more backup storage nodes, represented in FIG. 1 by backup storage node 114. Backup storage node 114 is configured to store on backup media 116 (e.g., hard disk drives, tape or other removable media, etc.) backup data received via network 108.

In the example shown in FIG. 1, application code 118 running on application server 102 makes changes to application data 106 via write operations that are intercepted or otherwise received by filter driver 120. Filter driver 120 updates a change block map 122 to track which blocks on disk have been changed since a last backup as a result of write or delete operations by application code 118. Backup agent 104 has access to the change block map 122 and, in various embodiments, may use information stored in change block map 122 to determine an amount of data that has changed since the last backup. For example, backup agent 104 may query a file system used to store application data 106 to determine a block size the file system is configured to use. Periodically, or based on some other criteria and/or trigger, the backup agent 104 may check the change block map 122 to determine the number of blocks that have been marked in change block map 122 as having been changed since the last backup. Backup agent 104 and/or another entity may compute an amount of data that has changed since the last backup, e.g., by multiplying the number of blocks that have changed by the block size. In various embodiments, the computed amount of changed data may be compared to a threshold to determine whether a backup should be performed.

Figure 2:
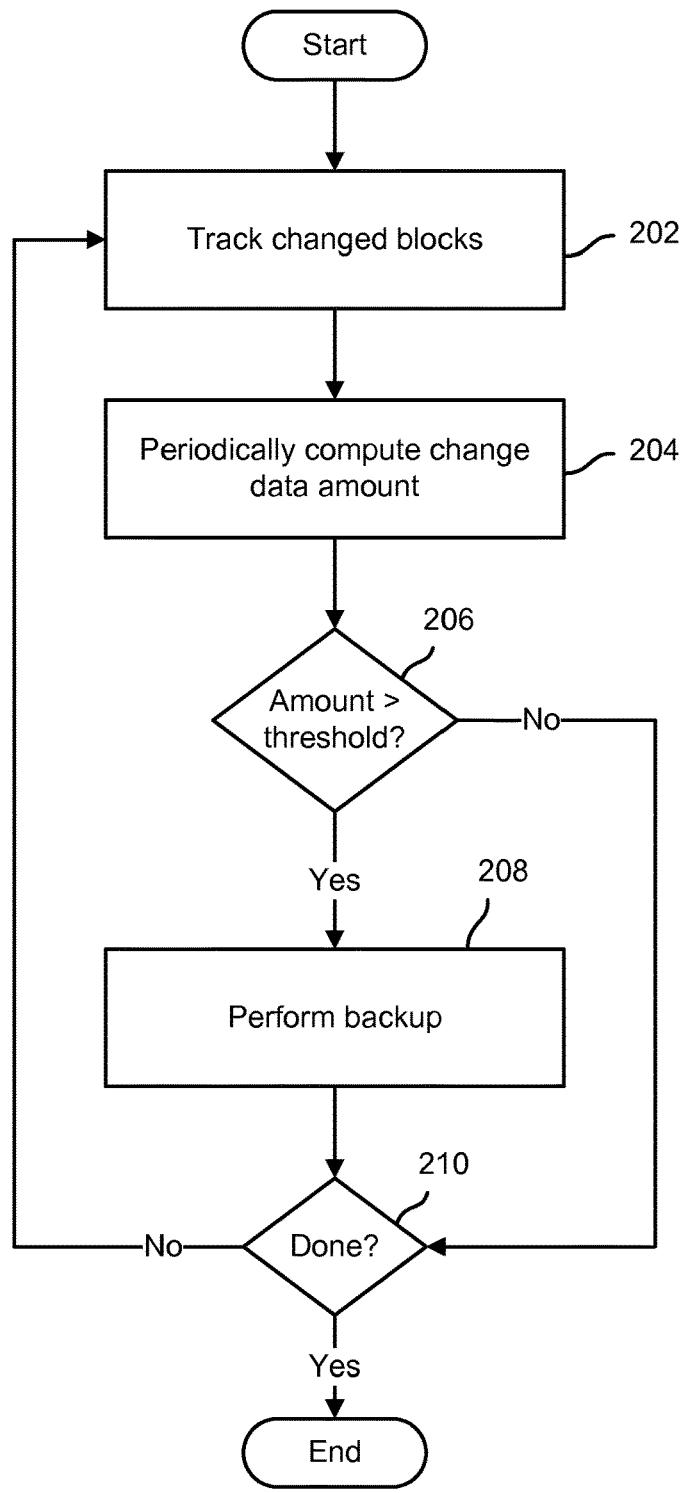
FIG. 2 is a flow chart illustrating an embodiment of a process to back up data.

FIG. 2 is a flow chart illustrating an embodiment of a process to back up data. In various embodiments, all or part of the process of FIG. 2 may be implemented by components installed on an application server, such as application server 102 of FIG. 1. For example, all or part of the process of FIG. 2 may be performed by one or more of the backup agent 104, the filter driver 120, and the change block map 122 of FIG. 1. In the example shown in FIG. 2, blocks that have been changed since a last backup, e.g., by an application with which files or other data objects stored in the respective blocks are associated, are tracked (202). For example, a change block map such as change block map 122 of FIG. 1 may be updated to reflect changes made by application code, such as application code 118, since the last backup. Periodically, and/or based on other criteria and/or triggers, an amount of data that has been changed since the last backup is computed (204). For example, a number of blocks that have been changed since the last backup may be determined and the determined number of blocks multiplied by a previously-determined and/or configured block size to compute an amount of data that has changed since the last backup.

If the amount of data that has been changed since the last backup (204) is greater than a prescribed threshold (206), a backup is performed (208). Otherwise (206), tracking of changed blocks (202) and periodically computing an amount of changed data (204) continue to be performed unless/until the amount of changed data is determined to be greater than the prescribed threshold (206) or the backup processing is done (210), e.g., the system is secured or taken offline for maintenance.

In various embodiments, the prescribed threshold amount of data to trigger a backup (206) may be configured, e.g., via an administrative interface. The threshold may be set to reflect a maximum amount of data desired to be at risk of being lost in the event of a catastrophic failure or human error (e.g., accidental deletion) between backups.

Figure 3:
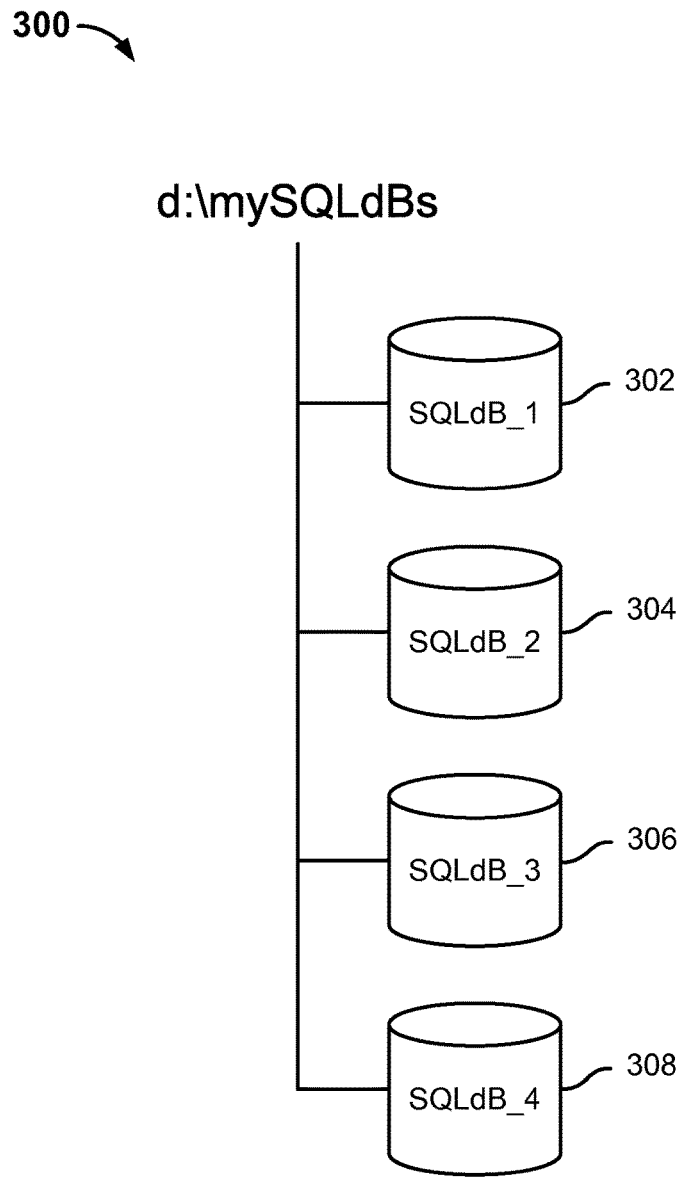
FIG. 3 is a block diagram illustrating an example of a save set in an embodiment of a backup system.

FIG. 3 is a block diagram illustrating an example of a save set in an embodiment of a backup system. In various embodiments, backup techniques disclosed herein may be used to backup individual files and/or other subsets of a save set independently of one another, each accordingly to a computed and/or otherwise detected amount of data that has changed for that give file or other subset of data. In the example shown in FIG. 3, for example, a save set 300 includes four SQL database files 302, 304, 306, and 308. In some embodiments, changed blocks may be tracked as described above. File offsets may be used in conjunction with the change block tracking data to determine for each of one or more files a number of blocks associated with that file that have been changed since the last backup. An amount of data that has changed for that file may then be computed, based on the block size, and a backup of that file may be triggered, for example, if the amount of data that has been changed for that file exceeds a prescribed threshold applicable to that file.

Figure 4:
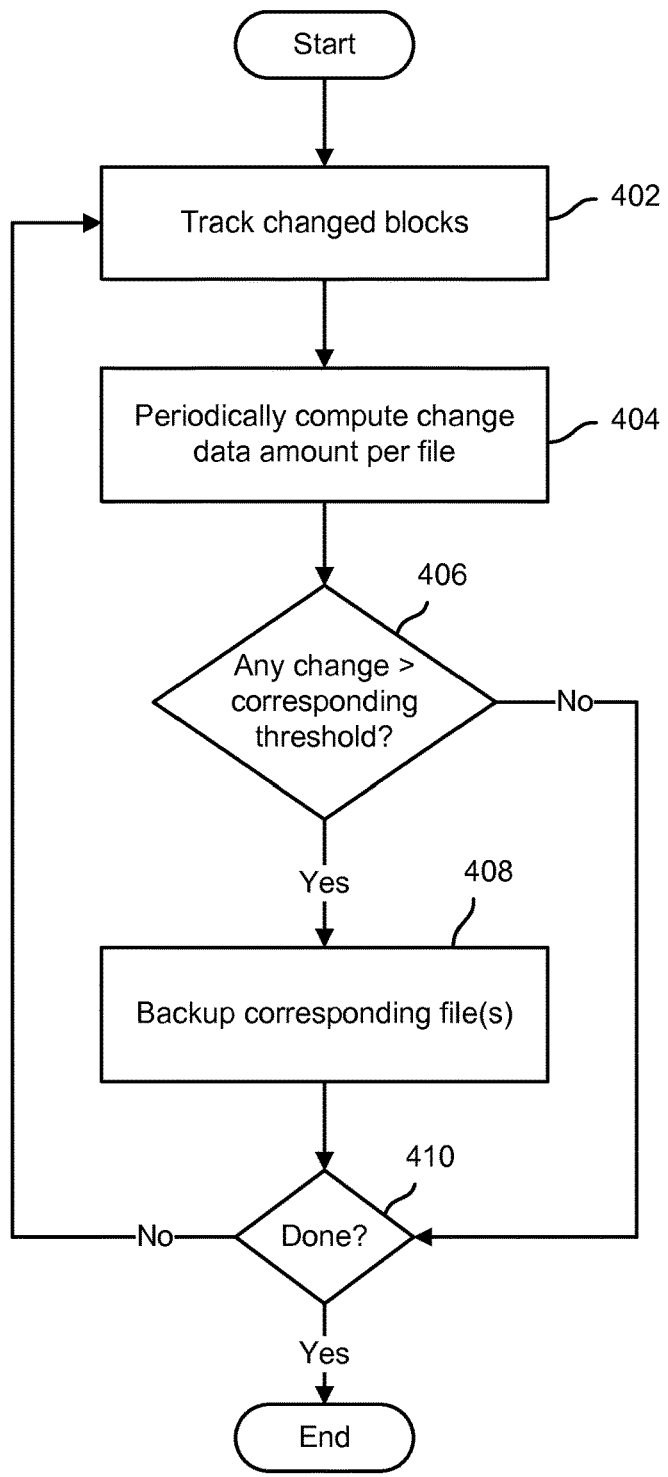
FIG. 4 is a flow chart illustrating an embodiment of a process to back up files or other subsets of data based on an amount of data that has changed.

FIG. 4 is a flow chart illustrating an embodiment of a process to back up files or other subsets of data based on an amount of data that has changed. In various embodiments, a backup agent, such as backup agent 104 of FIG. 1, may perform the process of FIG. 4, e.g., with respect to a save set comprising multiple files or other objects, such as save set 300 of FIG. 3. In the example shown, changed blocks are tracked, e.g., for a named drive (e.g., \d:) or other volume or save set (402). Periodically, an amount of data that has changed per file or other object or subset is computed (404). For example, file offsets may be used to determine which changed blocks are within a range of blocks associated with a given file. The number of changed blocks associated with the file may then be multiplied by the block size being used by the file system to compute an amount of changed data for that file. If for any file (or other object or subset) the amount of data that has changed exceeds a corresponding threshold (406), a backup of that file or other object is performed (408). Otherwise, monitoring continues on a per file basis unless/until a backup is triggered (406) or the process is determined to be done (410).

In various embodiments, a per-file threshold for the amount of changed data that will trigger a backup may be configured via an administrative user interface on a system wide and/or on a per file basis. For example, for a highly mission critical database or other file, the threshold may be lower than for a less important file.

Figure 5:
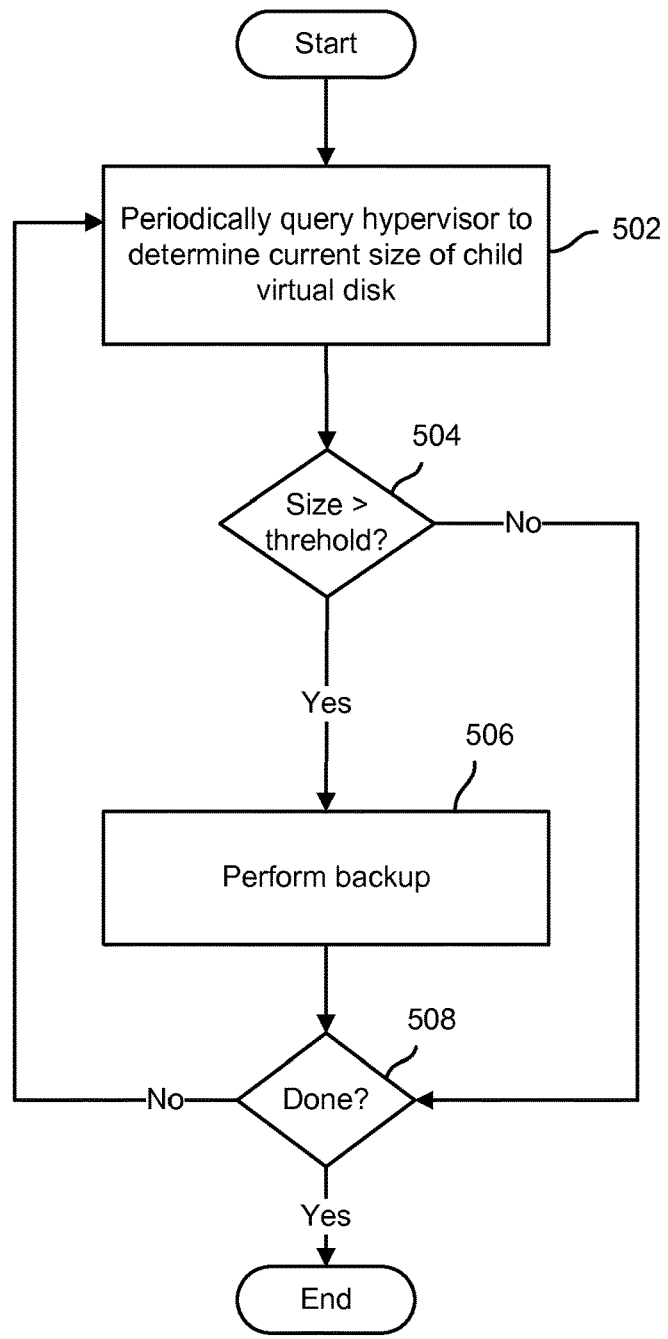
FIG. 5 is a flow chart illustrating an embodiment of a process to back up a virtual machine based on an amount of data that has changed.

FIG. 5 is a flow chart illustrating an embodiment of a process to back up a virtual machine based on an amount of data that has changed. In the example shown, a hypervisor with which the virtual machine is associated is queried periodically to determine a current size of a child virtual hard disk ("child differencing VHD") that contains changes to the virtual machine's data that have been made since a last backup of the virtual machine (502). If the current size of the child VHD exceeds a prescribed threshold (504), a backup of the virtual machine is performed (506). Otherwise, monitoring of the child VHD size (502) continues unless/until a backup is triggered (504, 506) or the process is determined to be done (508).

Using techniques disclosed herein, exposure to data loss may be limited to an amount set as a threshold to trigger backup based on the dynamically determined amount of data that has been changed, rather than relying on the time between backups as a proxy for the amount of data that has changed. In addition, backup may be triggered at any desired granularity, e.g., at the file level, by determining the amount of data that has changed at the desired level of granularity and performing a backup if a data change threshold applicable to the particular file or other subset of data is exceeded.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of protecting against data loss, comprising:
    determining, by one or more processors, an amount of data that has changed since a last backup of at least a defined subset of a save set, wherein determining the amount of data that has changed since a last backup comprises querying a child differential virtual hard disk to determine a size of the child differential virtual hard disk, and wherein the child differential virtual hard disk is configured for block tracking a virtual machine associated with a hypervisor;
    comparing, by one or more processors, the determined amount of changed data to a corresponding threshold, wherein the comparing the determined amount of changed data to a corresponding threshold is performed on a file-by-file basis; and
    performing, by one or more processors, a backup based at least in part on a determination that the determined amount of changed data equals or exceeds the threshold, wherein the performing the backup based at least in part on the determination is performed with respect to one or more files for which the determined amount of changed data exceeds the corresponding threshold.

2. The method of claim 1, wherein determining the amount of changed data includes reading a change block tracking data structure to determine a number of changed blocks and multiplying the number of changed blocks by a block size to compute the amount of data that has changed since the last backup.

3. The method of claim 2, wherein the at least a defined subset comprises a file or other data object and wherein reading the change block tracking data structure to determine the number of changed blocks comprises reading a portion of the change block tracking data structure that is associated with the file or other data object.

4. The method of claim 3, wherein reading said portion of the change block tracking data structure that is associated with the file or other data object includes reading within the change block tracking data structure a range of offsets that is associated with the file or other data object.

5. The method of claim 1, wherein the at least a defined subset of the save set comprises a database or other file and the determined amount of changed data comprises an amount of data that has been changed in that database or other file.

6. The method of claim 5, wherein the corresponding threshold is specific to said database or other file.

7. The method of claim 1, wherein the at least a defined subset of a save set comprises data associated with the virtual machine.

8. The method of claim 7, wherein data that has changed since a last backup of the virtual machine is stored in the child differential virtual hard disk associated with the virtual machine, and wherein determining the amount of changed data includes determining a current size of the child differential virtual hard disk.

9. The method of claim 8, wherein the current size of the child differential virtual hard disk is determined by querying the hypervisor with which the virtual machine is associated.

10. The method of claim 1, wherein said step of determining an amount of data that has changed since a last backup of at least a defined subset of a save set is performed at a prescribed interval until the determined amount of changed data is determined to equal or exceed the corresponding threshold.

11. The method of claim 1, wherein the hypervisor creates the child differential to perform change block tracking with respect to the hypervisor.

12. The method of claim 1, wherein the comparing the determined amount of changed data to the corresponding threshold comprises comparing the size of the child differential virtual hard disk to the corresponding threshold.

13. A system to protect against data loss, comprising:
    a memory; and
    a processor coupled to the memory and configured at least in part by computer instructions stored in the memory to:
        determine an amount of data that has changed since a last backup of at least a defined subset of a save set, wherein to determine the amount of data that has changed since a last backup comprises querying a child differential virtual hard disk to determine a size of the child differential virtual hard disk, and wherein the child differential virtual hard disk is configured for block tracking a virtual machine associated with a hypervisor;
        compare the determined amount of changed data to a corresponding threshold wherein to compare the determined amount of changed data to a corresponding threshold is performed on a file-by-file basis; and
        perform a backup based at least in part on a determination that the determined amount of changed data equals or exceeds the threshold, wherein to perform the backup based at least in part on the determination is performed with respect to one or more files for which the determined amount of changed data exceeds the corresponding threshold.

14. The system of claim 13, wherein determining the amount of changed data includes reading a change block tracking data structure to determine a number of changed blocks and multiplying the number of changed blocks by a block size to compute the amount of data that has changed since the last backup.

15. The system of claim 14, wherein the at least a defined subset comprises a file or other data object and wherein reading the change block tracking data structure to determine the number of changed blocks comprises reading a portion of the change block tracking data structure that is associated with the file or other data object.

16. The system of claim 15, wherein reading said portion of the change block tracking data structure that is associated with the file or other data object includes reading within the change block tracking data structure a range of offsets that is associated with the file or other data object.

17. The system of claim 13, wherein the at least a defined subset of the save set comprises a database or other file and the determined amount of changed data comprises an amount of data that has been changed in that database or other file.

18. The system of claim 17, wherein the corresponding threshold is specific to said database or other file.

19. The system of claim 13, wherein the at least a defined subset of a save set comprises data associated with the virtual machine.

20. The system of claim 19, wherein data that has changed since a last backup of the virtual machine is stored in the child differential virtual hard disk associated with the virtual machine, and wherein determining the amount of changed data includes determining a current size of the child differential virtual hard disk.

21. The system of claim 20, wherein the current size of the child differential virtual hard disk is determined by querying the hypervisor with which the virtual machine is associated.

22. A computer program product to protect against data loss, the computer program product being embodied in a non-transitory computer readable storage medium and comprising computer instructions for:
- determining, by one or more processors, an amount of data that has changed since a last backup of at least a defined subset of a save set, wherein determining the amount of data that has changed since a last backup comprises querying a child differential virtual hard disk to determine a size of the child differential virtual hard disk, and wherein the child differential virtual hard disk is configured for block tracking a virtual machine associated with a hypervisor;
- comparing, by one or more processors, the determined amount of changed data to a corresponding threshold, wherein the comparing the determined amount of changed data to a corresponding threshold is performed on a file-by-file basis; and
- performing, by one or more processors, a backup based at least in part on a determination that the determined amount of changed data equals or exceeds the threshold, wherein the performing the backup based at least in part on the determination is performed with respect to one or more files for which the determined amount of changed data exceeds the corresponding threshold.

* * * * *